United States Patent Office 2,777,483
Patented Jan. 15, 1957

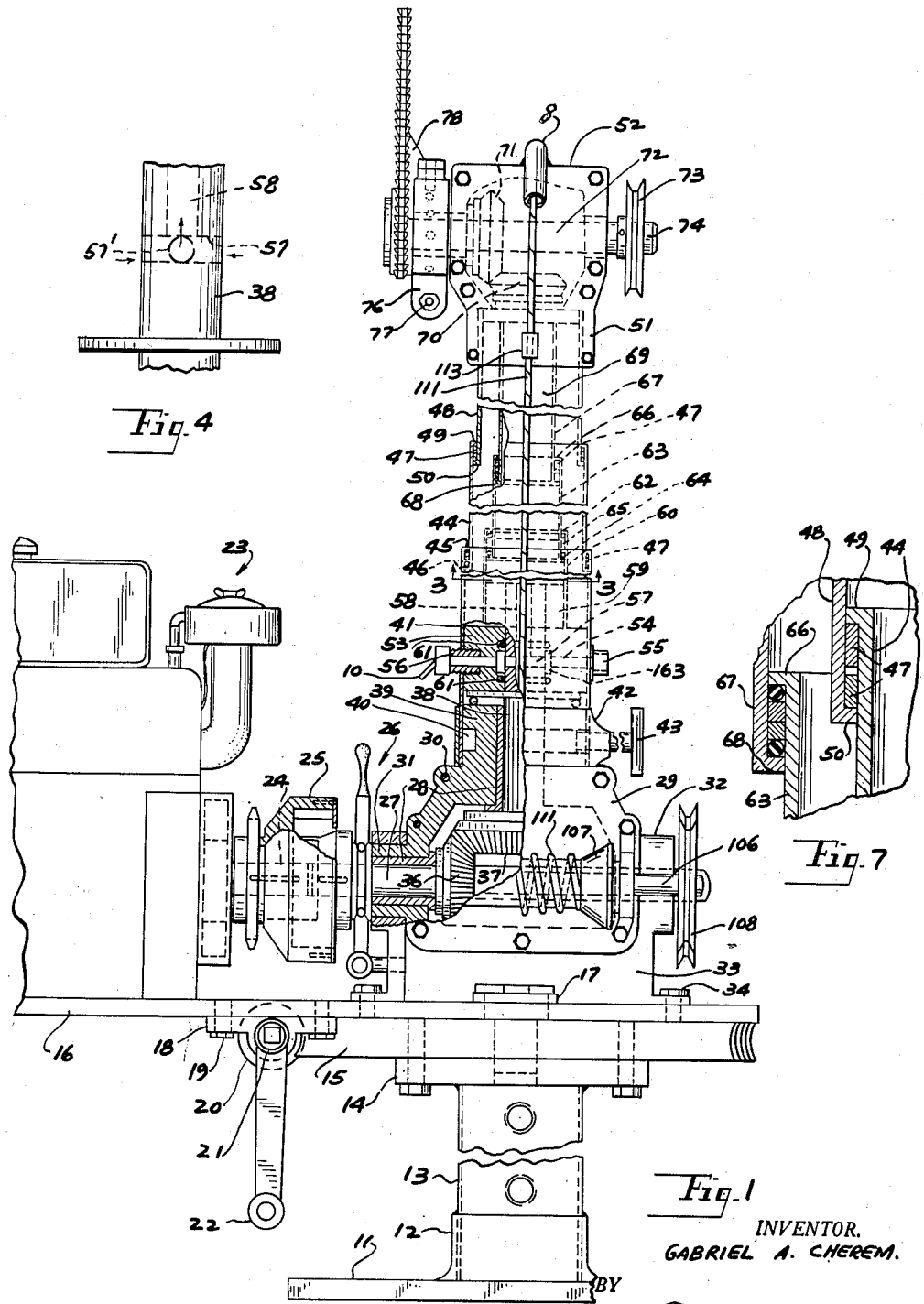

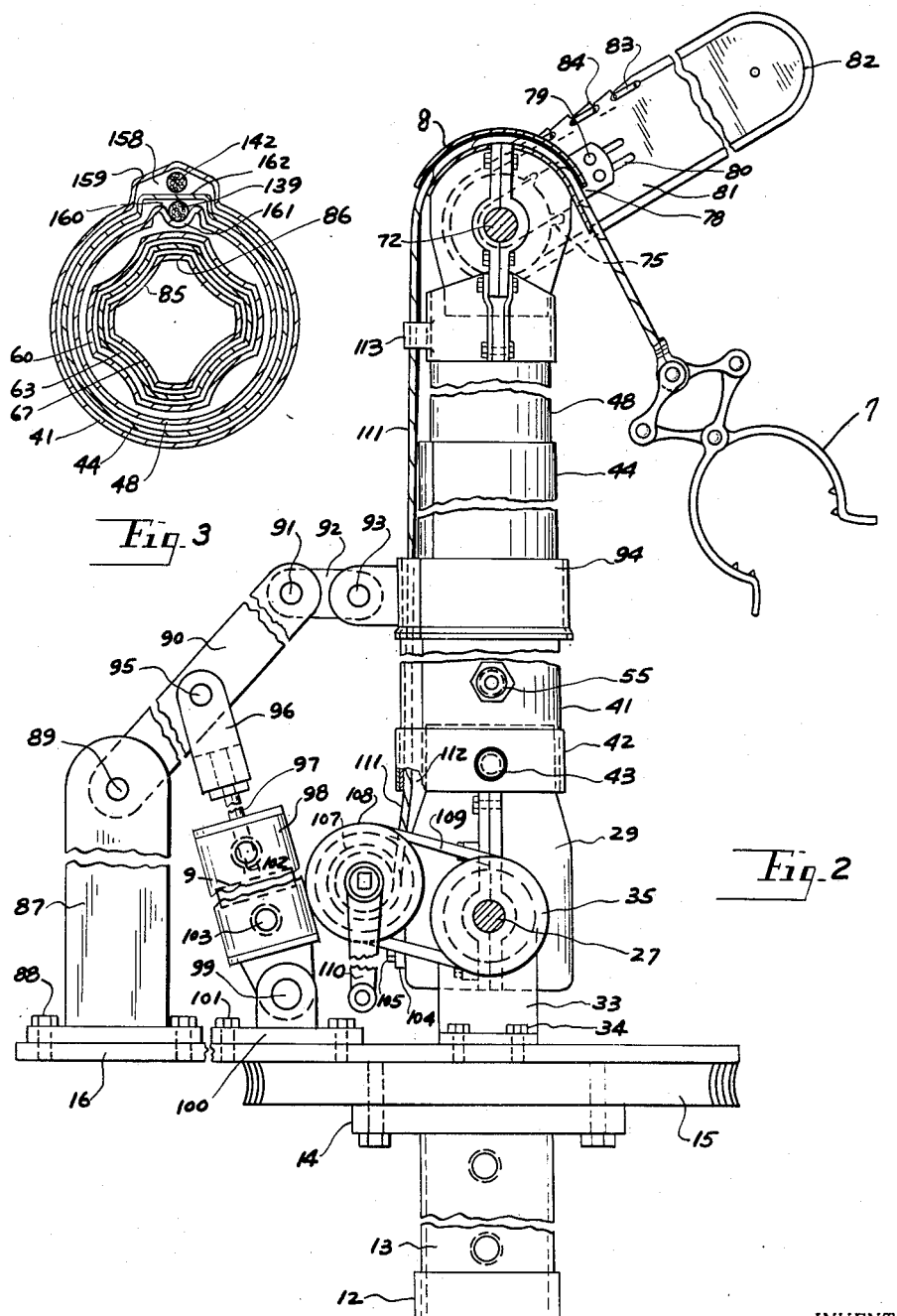

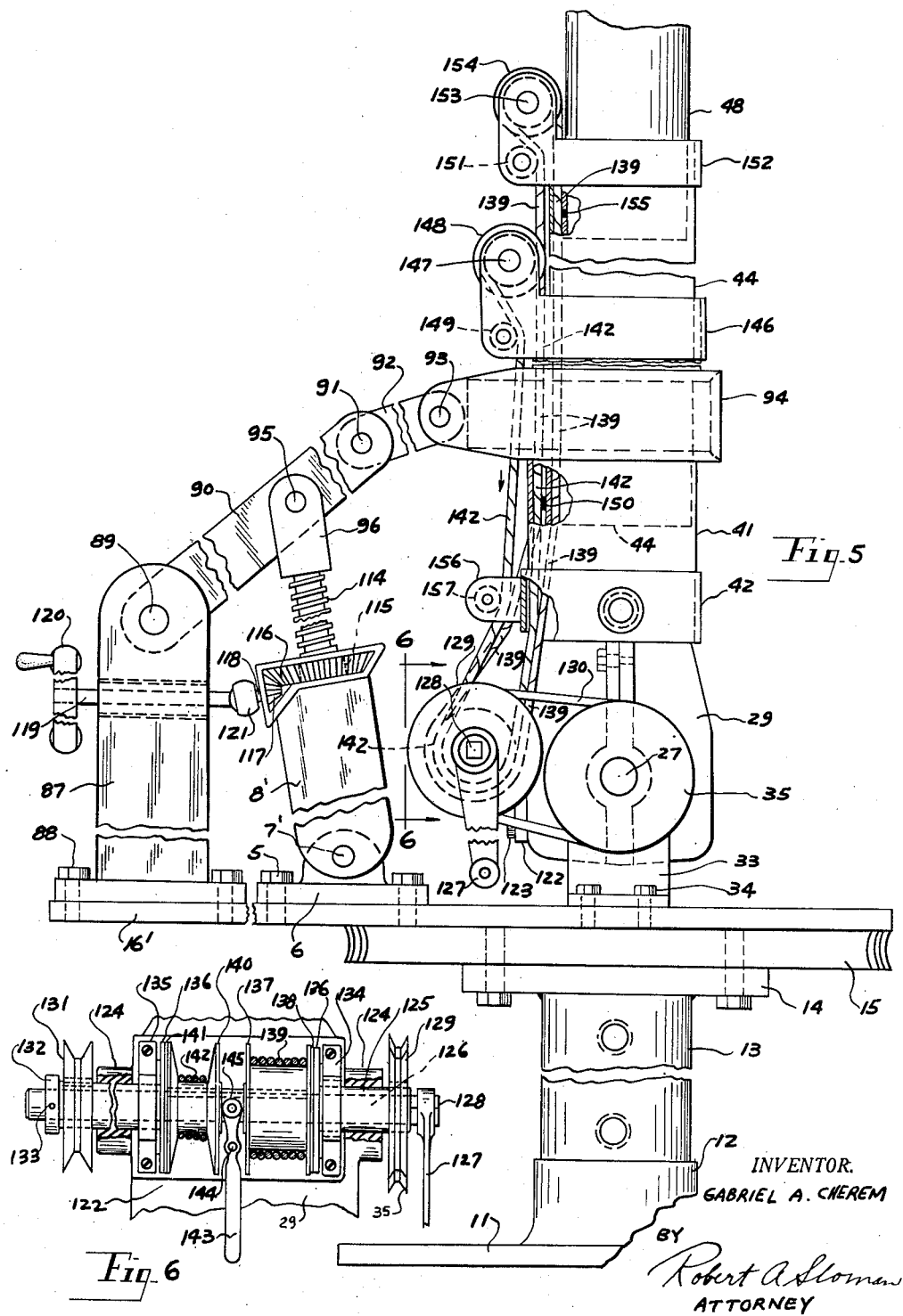

2,777,483

TREE PRUNER AND TRIMMER BASED ON A PORTABLE PLATFORM

Gabriel A. Cherem, Detroit, Mich.

Application March 2, 1955, Serial No. 491,747

9 Claims. (Cl. 143—43)

This invention relates to a telescoping tree pruner and trimmer and is a continuation in part of my copending patent application, Serial Number 414,461, filed March 5, 1954, relating to a telescoping tree pruner and trimmer, and issued July 31, 1956 as Patent No. 2,756,784.

It is the object of the present invention to provide certain improvements in telescoping tree trimmers and primarily to provide for an improved telescoping boom construction incorporating a series of telescoping guide sleeves.

It is the further object of the present invention to provide power operated means for effecting longitudinal extension of the telescoping boom construction and the telescoping drive mechanism.

It is the further object of the present invention to provide a hydraulic or pneumatic means in conjunction with the power transmitting telescoping tubes for effecting automatic extensions thereof.

It is the further object of the present invention to provide operative mechanism for mechanically returning the telescoped sections to a retracted position.

It is the further object of the present invention to provide a power operated or hydraulic or pneumatic boom control mechanism whereby the boom may be angularly adjusted upwardly and downwardly as desired.

It is the further object of the present invention to provide a mechanical power operated mechanism for raising and collapsing the telescoping boom construction and the telescoping driving connections between a pair of adjustably spaced gear housings forming a part of the trimming device.

These and other objects will be seen from the following specification and claims in conjunction with the appended drawings, in which:

Fig. 1 is a fragmentary partially broken-away and sectioned elevational view of the present tree trimming and pruning device.

Fig. 2 is a right side elevational view portionally broken away, for illustration.

Fig. 3 is a plan section through the extensible portions of said trimmer illustrating the telescoping guides and telescoping power transmitting tubes.

Fig. 4 (sheet 1) is a fragmentary enlarged view of the driven shaft of the lower housing and the fluid pressure passages therethrough.

Fig. 5 (sheet 3) is an elevational view similar to Fig. 2, partially broken away and sectioned and illustrating power operable mechanism for extending and collapsing the telescoping boom construction and for controlling the angularity thereof.

Fig. 6 is a fragmentary section taken on line 6—6 of Fig. 5; and

Fig. 7 (sheet 1) is a fragmentary section through a portion of the boom construction illustrating the cooperating flanges and retained guide bushings between adjacent portions of the telescoping guides and concentric telescoping power transmitting tubes.

It will be understood that the above drawings illustrate several preferred embodiments of the invention and that other embodiments are contemplated within the scope of the claims hereafter set forth.

Referring to Figs. 1 and 2, the present pruning device includes base 11 with upright collar 12 supportably receiving the standard 13 which carries transverse mounting plate 14 at its upper end which is bolted to the under surface of worm-wheel 15. The platform 16 is supportably positioned upon said worm-wheel and swively mounted thereon by the swivel pin 17. Platform 16 has a depending bracket 18 secured thereto at 19 for journaling worm-gear 20 which is in mesh with worm-wheel 15 and is secured upon shaft 21 which has crank handle 22 for rotating the same. Rotation of gear 20 will thus effect a rotary movement of platform 16 carrying the pruning mechanism hereafter described with respect to the base 11.

Mounted upon platform 16 is a source of power such as the motor 23 and which has an output shaft 24 carrying clutch housing 25. Manually operable clutch mechanism 26 is joined to drive shaft 27 for transmitting rotative motion thereto as desired.

Said shaft is journaled through thrust bushings 28 carried within the centrally apertured and aligned oppositely directed sleeves 31 at the opposite ends of gear housing 29. Said gear housing is formed in halves which are secured together as by a series of bolts and nuts 30.

Drive shaft 27 extends through said gear housing and has secured thereto upon the interior of the housing pinion gear 36 which is in mesh with pinion 37 joined to driven shaft 38 which projects outwardly through thrust bushing 28 within the sleeve portion 39 forming a part of said gear housing.

The oppositely arranged sleeve 31 on said housing are positioned within the transverse aligned journals 32 of the bifurcated gear housing mounting bracket 33 which is bolted to platform 16 as at 34.

The sleeve 31 receive therein thrust bushings 28 at opposite ends of housing 29 which receive the drive shaft 27 which extends therethrough and which carries upon its outer end upon the exterior of housing 29 the pulley 35 for rotation therewith.

The upright housing sleeve 39 has an annular slot 40 in its exterior surface adapted to receive the pin 43 which projects through the clamping sleeve 42 and which extends around the lower end of the elongated sleeve 41 which projects around housing sleeve 39. The pin 43 thus secures sleeve 41 to the housing but, nevertheless, permits rotation thereof if desired and at the same time provides a means for clamping sleeve 41 to the said housing. There are provided a series of telescoping guide sleeves which include sleeve 41, sleeve 44 and sleeve 48, as shown in Fig. 1, said sleeves defining a telescoping boom for the remote sawing mechanism hereafter described in conjunction with the second gear housing 52. The upper end of sleeve 41 which receives the lower end of guide sleeve 44 has an annular flange 45 which slidably engages sleeve 44. The lower end of sleeve 44 has annular flange 46 which slidably engages the interior wall of sleeve 41. A suitable annular bushing 47 is interposed between the said flanges 45 and 46 to facilitate relative sliding movements between sleeve 44 and sleeve 41. The lower end of sleeve 48 projects into the upper end of sleeve 44 and has an outwardly directed annular flange 50 which engages the inner surface of sleeve 44. The upper end of sleeve 44 has an inwardly directed annular flange 49 which engages the outer surface of guide sleeve 44 in cooperation with flange 50 and interposed between said flanges is a guide bushing 47 to facilitate relative sliding movement.

The upper end of guide sleeve 48 projects within the annular hollow depending sleeve portion 51 on second gear housing 52 and is secured therein providing a mounting for said second gear housing upon the boom defined by sleeve elements 41, 44 and 48.

Cylindrical block 53 is positioned within lower sleeve 41 and has formed therethrough a transverse passage 54, one end of which communicates with fitting 55 adapted to have connected thereto a source of fluid under pressure or compressed air. The opposite end of passage 54 terminates in the exhaust fitting 56 to permit the escape of exhaust fluid, as hereafter described. The driven shaft 38 has transverse passages 57 (Fig. 4) and 57' which register with passage 54 and which are centrally in communication with the upright passage 58 formed longitudinally of shaft 38 and which establishes fluid communication to the interior of a series of telescoping power transmitting tubes 60, 63 and 67, for effecting hydraulic or pneumatic elevation of gear housing 52 by causing longitudinal expansion movements of the three power sleeves 60, 63 and 67, the upper end of the uppermost of said sleeves being closed off so as to act as a pressure responsive piston. A control valve 10 is mounted over exhaust fitting 56 and is adjustable whereby when closed, pressure fluid will be delivered from fitting 55 and passage 54 through passage 58 and up into the interior of the power transmitting sleeves and upon the application of pressure to the upper end portion of the uppermost of the three sleeves will cause a gradual telescoping elevation of said sleeves for extending the boom and the gear housing 52 carried at its upper end.

When it is desired to permit lowering of the saw and gear housing 52, the pressure fluid may be released by adjusting the control valve 10 which will permit the escape of fluid. While it is possible that the gear casing 52 and the telescoping elements may return by gravity upon release of pressure, the present disclosure includes a power mechanism for mechanically returning the boom to a retracted position. This includes a flexible cable 111 (Fig. 2) which extends through guide 113 and through tubular arcuate guide 8 secured to the top of gear casing 52. Cable 111 has secured at one end the lazy tongs clamp 7 adapted to grip the limb of a tree to be sawed.

Cable 111 extends downwardly upon the exterior of the guide sleeves 41, 44 and 48, as shown in Figs. 1 and 2, and is wound around the drum 107 upon the support 104 with mounting bracket secured to gear casing 29 as by the fasteners 105. Shaft 106 is secured to drum 107 and extends outwardly of support 104 and has secured thereto a pulley 108 which is connected with pulley 35, Fig. 2, by belt 109. Thus the power transmitted through drive shaft 27 and which is normally adapted for driving the saw mechanism, as hereafter described, may also be employed for operating the retracting mechanism for the boom inasmuch as downward movement of cable 111 retracts clamp 7 against guide 8.

Referring to Fig. 1, the upper end of driven shaft 38 is secured to the formed block 59 which is secured within the lower end of rotatable drive tube 60. The upper end of said tube telescopically receives tube 63 which is of similar cross sectional shape as indicated in Fig. 3 and which has at its lower end an outwardly directed annular flange 64 which slidably engages the interior surface of tube 60. Tube 60 has an inwardly directed annular flange at its upper end which slidably engages tube 63. Guide bushing 65 of annular shape extends around tube 63 between flanges 62 and 64. The upper end of tube 63 includes a similarly shaped drive tube 67 which projects down thereinto in driving relation in view of the corresponding irregular cross sectional shape shown in Fig. 3, and this tube 67 at its lower end has an annular flange 68 which engages tube 63. Tube 63 has an annular flange 66 at its upper end which slidably engages telescoping drive tube 67. A suitable guide bushing of annular shape 47 is interposed between the two flanges 66 and 68 to facilitate telescoping adjustments.

A pair of annular seals 61 are nested within the block 53 at the lower end of guide sleeve 41 and cooperatively engage the rotatable driven shaft 38 to prevent the escape or seepage of pressure fluid between the said shaft and the said block 53.

The upper end of drive tube 67 extends around the lower formed end of drive shaft 69 which is journaled within gear housing 52 and which has secured thereto upon the interior of said housing a pinion 70. This pinion is in mesh with a second pinion 71 secured upon driven shaft 72 which is suitably journaled through gear housing 52 in a manner similar to the journalling of shaft 27 through gear housing 29. Shaft 72 projects from gear housing 52 and has secured thereto as by the nut 74 the power take-off pulley 73. Upon the opposite end of housing 52 there is an outwardly projecting annular sleeve over which is adjustably secured the saw mounting bracket 76 as by the fastener 77. Said bracket has an angularly related saw support mounting plate 78, Figs. 1 and 2, to the outer end of which are adjustably mounted support plates 81, there being a pair of elongated slots 80 formed in plates 81 adapted to adjustably receive fasteners 79 which extend from the mounting arm 78 and which permit of radial adjustment of saw mounting plates 81.

As shown in Fig. 2, conveyor chain driving sprocket 75 is secured upon the end of shaft 72 upon the exterior of housing 52 and adjacent bracket 76. A guide 82 is mounted within the outer ends of plates 81 and is adapted to receive thereover the sprocket chain 83 which extends around the sprocket 75. Said chain 83 has secured thereon the continuous oppositely directed saw blade elements 84 which thereby complete the saw construction. By adjusting the bracket 76 it is possible to adjust the angle of the saw mounting plates 81 as desired with respect to the boom and the gear housing 52.

Referring to Fig. 3, numerals 41, 44 and 48 designate the three guide tubes for illustration, which form the supporting boom for the saw mounting gear housing 52 and which thereby provide for telescoping adjustments of the said boom, said sleeves being substantially cylindrical in shape.

Loosely positioned with respect to said guide sleeves are the series of rotatable power transmitting tubes 60, 63 and 67, which are of irregular shape and cross section as designated at 85 and 86 to thereby establish an effective driving relation between the three tubes so that power transmitted from driven shaft 38 to tube 60 will be transmitted through the intermediate drive tube 63 to tube 67 and thence through drive shaft 69 and eventually, through saw-driving shaft 72 on the gear housing 52. The illustration in Fig. 3 illustrates one preferred construction for the said driving tubes to thereby establish a driving relation between them.

To facilitate adjustment of the boom 41—44—48, and to permit angular adjustments thereof and at the same time provide a support therefor, there is provided a mechanical boom control, as shown in Fig. 5, or a hydraulic or pneumatic boom control, as shown in Fig. 2. Referring to Fig. 2, the upright elongated support 87 is secured to platform 16 as at 88, and has pivotally connected at its upper end as at 89 the elongated lever 90, whose upper end is pivotally connected as at 91 to the laterally arranged arm 92 pivotally connected at 93 to the supporting sleeve 94 which loosely surrounds the said boom and which is adapted for vertical adjustments with respect to portions thereof.

Intermediate the ends of lever 90 and pivotally connected thereto as at 95 is an operating arm 96 which is secured to the reciprocal piston rod 97 which projects from cylinder 98, the lower end of which is pivotally mounted as at 99 to the mounting plate 100 secured at 101 to platform 16. Cylinder 98 is broken away for illustration, and includes therein a reciprocal piston such as piston 9 which is secured to piston rod 97 and which will respond to the application of pressure fluid which may be either liquid or compressed air directed to either of the inlets 102 or 103. Pressure applied at port 102 will cause a lowering movement of the boom support, whereas, application of pressure fluid to port 103 will cause elevation of arm 96 and, accordingly, an upward adjustment of boom supporting lever 90. By this construction there is provided fluid pressure means for controlling the raising and lowering of the said boom.

Fig. 5 illustrates a jack screw manually operable means for controlling angular raising and lowering of the boom elements 41, 44 and 48, which are fragmentarily shown. Here, instead of the hydraulic cylinder 98 of Fig. 2, there is provided the rotatable screw 114 which is loosely joined at its upper end to the arm 96 and at its lower end threads through a nut 115 and extends down into the cylindrical elongated support 8' which is pivotally mounted at 7' upon plate 6 and which is secured to platform 16' as by the fasteners or bolts 5.

The nut 115 is carried within the pinion 116 journaled at the upper end of housing 8 and which is in mesh with the drive pinion 117 on the shaft 118. Said shaft is rotatably driven by the elongated shaft 119 and which carries handle 120, said shaft being journaled through the upright support 87 and suitably joined to shaft 118 as by the universal joint 121. Thus rotation of shaft 119 will cause vertical extension movements of screw 114 to thereby effect angular raising and lowering of arm 96 to thereby mechanically control raising and lowering of the boom.

In connection with Fig. 2 wherein there was described a cable 111 for effecting a vertical retraction of the boom upon release or opening of valve 10, the said cable was wound upon drum 107 through the operation of pulley 108 interconnected with power driven pulley 35 by the belt 109. Furthermore, the said drum driving shaft 106 may be rotated manually by the handle 110 rather than by the use of power, whichever is desired by the operator. In Fig. 2 it will be noted that the cable 111 extends through a recess 112 formed in the lower guide tube securing sleeve 42, and furthermore, that said cable loosely extends through the boom supporting sleeve 94.

The above description has set forth a hydraulic or pneumatic means through the fitting 55 and the interior of the power transmitting tubes for effecting elevation of the telescoping boom. Retraction thereof was controlled by opening release valve 10 permitting the escape of pressure fluid and the said boom was mechanically lowered by the cable 111 under the actuation of drum 107 which was either manually operated through the handle 110 or power operated through the pulleys 35 and 108 and the interconnecting belt 109.

It is contemplated as a part of the present invention that the said telescoping boom may be raised and lowered by a power operated mechanism employing cable for not only raising but for lowering the same.

For this purpose there is shown in Figs. 5 and 6 a bracket 122 secured at 123 to lower gear housing 29 adjacent platform 16'. Said bracket is bifurcated and has a pair of spaced journals 124 adapted to receive bushings 125 through which extends rotatable shaft 126. Upon the squared end 128 of said shaft upon the exterior of bracket 122 there is secured a handle 127 whereby said shaft may be manually rotated in one direction or the other. There is also secured upon said shaft a pulley 129 which is adapted to be interconnected with pulley 35 by the belt 130 whereby shaft 126 may be power rotated in one direction or the other.

Upon the opposite end of shaft 126 is a second pulley 131 secured thereto and retained against longitudinal adjustment by the securing collar 132 and the transverse pin 133.

Within the bracket 122 intermediate the journals 124 are a pair of rotatable clutches 134 and 135 which are keyed to shaft 126 for rotation therewith, each of said clutches including a rotatable clutch plate 136 inwardly thereof, whose plane surface lies at right angles to the axis of shaft 126.

Drum 137 is loosely journaled upon shaft 126 and adapted for longitudinal sliding movements thereon and carries upon one side a complementary clutch plate 138 which is adapted for cooperative frictional engagement with clutch plate 136 of clutch 134. Cable 139 is secured to and wound around drum 137 and is adapted for raising and lowering the upper telescoping guide sleeve 48 in the manner hereafter described.

There is provided a second spool or drum 140, loosely journaled upon shaft 126 and which has a clutch plate 141 upon one end thereof adapted for frictional contact with clutch plate 136 on clutch 135 whereby the said spool may be rotated from the rotation of shaft 126. Cable 142 is secured to and wound around spool 140 and is adapted to effect raising and lowering of the intermediate guide sleeve 44 of the boom in the manner hereafter described.

Control arm 143 pivoted to bracket 122 at 144 intermediate spools 137 and 140 carries an operating disc 145 at its upper end which is alternately engageable operatively with either of the spools 137 or 140 for projecting its respective clutch plate 138 or 141 into frictional contact with the respective clutch plate 136 upon the said clutches 134 or 135. Thus, with shaft 126 rotating in one predetermined direction, a tilting of handle 143 in a counterclockwise direction will cause rotation of drum or spool 140 to effect a raising of guide sleeve 44. When this has been raised to the desired point of elevation the control arm 143 may then be rotated in a clockwise direction, disengaging spool 140 from shaft 126 and engaging spool 137 with said shaft through the above described clutch mechanism. This will cause a successive elevation of the third guide sleeve 48 for raising the same above and with respect to guide sleeve 44. Of course, as sleeve 48 is mounted upon sleeve 44 there will be an initial elevation of sleeve 48 upon the initial elevation of sleeve 44.

In operation, when it is desired to expand the boom, the spool 140 is first rotated causing a vertical movement downwardly of a portion of cable 142, being the outermost portion of said cable shown in Fig. 5. Said cable extends past guide 149 which is carried by the cylindrical bracket 146 secured to the upper end of stationary guide sleeve 41. Said bracket also journals thereon at 147 the pulley 148 over which cable 142 extends. The return flight of cable 142 is upon the interior of sleeve 41 and extends downwardly through said sleeve and is joined as at 150 to the lower end of sleeve 44, said cable 142 then returning to spool 140, being a continuous cable with several windings around spool 140. Downward movements of the outer portion of cable 142 will effect an upward movement of the inner portion of said cable within sleeve 41 and will produce a mechanical raising of sleeve 44. When sleeve 44 has been raised to the height desired the spool 140 will be deactivated by release of the control arm 143 and thereafter said control arm will engage spool 137 with the rotatable clutch 134 to thereby effect a longitudinal movement of the continuous cable 139. Cable 139 extends from spool 137 and between the intermediate sleeve 44 and the inner sleeve 48 with the innermost portion of said cable indicated at the upper end of Fig. 5 secured at 155 to sleeve 48. Said cable extends around guide pulley 154 which is journaled at 153 upon the cylindrical bracket 152. Said bracket is secured upon the upper end of vertically adjustable sleeve 44. Cable 139 continues downwardly around guide 151 on bracket 152 upon the exterior of the said guide sleeves and extends past the guide 157 carried upon the support 156 which projects from the securing clamp 42, thus returning to its corresponding spool 137 where it joins cable 139 as a continuous cable wound several times around spool 137. This will produce elevation of guide 48 to its uppermost position. Should it be desired to reverse this process, it is merely necessary to reverse the direction of rotation of shaft 126 either under the control of manual means 127 or the power operated pulley 129. Naturally, it would be necessary to reenergize spool 137 first to effect a mechanical lowering of sleeve 48. Thereafter, spool 140 is reenergized for effecting a lowering of sleeve 44, of course, carrying therewith the telescopically enclosed sleeve 48, until both sleeves 44 and 48 are collapsed within the stationary guide sleeve 41.

Referring again to Fig. 5, it is seen that the outermost portion of cable 142 extends around guide 157 on support 156.

Cable 142 which is first moved for raising sleeve 44 extends upwardly between sleeve 41 and sleeve 44 within a chamber 158, Fig. 3, defined by an elongated hollow laterally projected portion 159 which forms a part of the outer sleeve 41.

The other cable 139 extends upwardly upon the interior of sleeve 44 and upwardly between sleeve 44 and the inner sleeve 48 within a chamber 160 which is defined by the elongated formed semi-circularly shaped plate element 161 formed in the inner sleeve 48 and which cooperates in spaced relation with an outwardly projected elongated plate formation 162 formed in a portion of the intermediate sleeve 44 and which thus defines the elongated passageway 160 and which receives cable 139.

Having described my invention, reference should now be had to the claims which follow for determining the scope thereof.

I claim:

1. A tree trimmer comprising a platform, a mounting bracket secured to said platform, a first gear housing pivotally mounted upon said bracket and having a drive shaft adapted for connection to a power source and a driven shaft projecting therefrom, a series of telescopically arranged guide sleeves with the lower end of the lowermost of said sleeves secured to said gear housing axially of its driven shaft, a second gear housing adjustably spaced from said first gear housing and including a drive shaft projecting thereinto and a driven shaft projecting therefrom adapted to carry a saw, the upper end of the uppermost of said guide sleeves being secured to said second gear housing axially of its drive shaft, thereby providing a telescoping boom for said saw, a series of rotatable telescopically aligned tubes slidably engaging each other in driving relation with the lower end of the lowermost of said tubes secured to the driven shaft of said first gear housing and with the upper end of the uppermost tube secured to the drive shaft of said second gear housing, the outer ends of the uppermost and lowermost drive tubes being closed defining a sealed expansible cylinder, and a fluid pressure source joined to the interior of the lowermost of said tubes for hydraulically extending said tubes longitudinally.

2. A tree trimmer comprising a platform, a mounting bracket secured to said platform, a first gear housing pivotally mounted upon said bracket and having a drive shaft adapted for connection to a power source and a driven shaft projecting therefrom, a series of telescopically arranged guide sleeves with the lower end of the lowermost of said sleeves secured to said gear housing axially of its driven shaft, a second gear housing adjustably spaced from said first gear housing and including a drive shaft projecting thereinto and a driven shaft projecting therefrom adapted to carry a saw, the upper end of the uppermost of said guide sleeves being secured to said second gear housing axially of its drive shaft, thereby providing a telescoping boom for said saw, a series of rotatable telescopically aligned tubes slidably engaging each other in driving relation with the lower end of the lowermost of said tubes secured to the driven shaft of said first gear housing and with the upper end of the uppermost tube secured to the drive shaft of said second gear housing, the outer ends of the uppermost and lowermost drive tubes being closed defining a sealed expansible cylinder, and a cylindrical block secured within the lower end of the lowermost sleeve having an axial aperture to receive the driven shaft of the first gear housing and a transverse slot extending therethrough, adapted for connection at one end with a source of pressure fluid, said driven shaft having an axial recess joined at one end to said transverse slot and at its other end communicating with the interior of said tubes.

3. A tree trimmer comprising a platform, a mounting bracket secured to said platform, a first gear housing pivotally mounted upon said bracket and having a drive shaft adapted for connection to a power source and a driven shaft projecting therefrom, a series of telescopically arranged guide sleeves with the lower end of the lowermost of said sleeves secured to said gear housing axially of its driven shaft, a second gear housing adjustably spaced from said first gear housing and including a drive shaft projecting thereinto and a driven shaft projecting therefrom adapted to carry a saw, the upper end of the uppermost of said guide sleeves being secured to said second gear housing axially of its drive shaft, thereby providing a telescoping boom for said saw, a series of rotatable telescopically aligned tubes slidably engaging each other in driving relation with the lower end of the lowermost of said tubes secured to the driven shaft of said first gear housing and with the upper end of the uppermost tube secured to the drive shaft of said second gear housing, the outer ends of the uppermost and lowermost drive tubes being closed defining a sealed expansible cylinder, a cylindrical block secured within the lower end of the lowermost sleeve having an axial aperture to receive the driven shaft of the first gear housing and a transverse slot extending therethrough, a fitting on the adjacent sleeve joined to one end of said slot and adapted for connection to a fluid pressure source, and an exhaust fitting upon said sleeve at the opposite end of said slot adapted for conection with an exhaust release valve, said latter shaft having an axial recess connected at one end with said slot and at its other end communicating with the interior of said tubes.

4. The tree trimmer of claim 1, a standard, a horizontally disposed worm-wheel secured upon said standard, said platform being swivelly mounted upon said worm-wheel, and a manually rotatable worm-gear journaled upon and depending from said platform in mesh with said worm-wheel.

5. The trimmer of claim 1, said first gear housing having a radial sleeve co-axial with its driven shaft over which the lower end of tthe lowermost sleeve is positioned, said radial sleeve having an exterior annular recess, a cylindrical clamp retainingly positioned over said radial sleeve upon the exterior of the adjacent guide sleeve, and a locking element extending radially through said clamp and guide sleeve and into said annular recess.

6. The trimmer of claim 1, a rotatable drum mounted on said first gear housing, and a cable wound around said drum and secured thereto at one end, with its other end secured to said second gear housing, whereby upon release of said pressure fluid from the interior of said tubes, said second gear housing may be mechanically lowered telescopically collapsing said guides and tubes.

7. The trimmer of claim 1, a rotatable drum mounted on said first gear housing, a cable wound around said drum and secured thereto at one end, with its other end secured to said second gear housing, whereby upon release of said pressure fluid from the interior of said tubes, said second gear housing may be mechanically lowered telescopically collapsing said guides and tubes, pulleys joined, respectively, to said drum and to the drive shaft of said first gear housing, and a belt interconnecting said pulleys.

8. The tree trimmer of claim 1, a standard spaced from said bracket, a lever pivotally mounted at one end upon said standard and at its other end loosely and slidably supporting said boom, a hydraulic cylinder pivotally mounted at one end upon said platform with its reciprocal piston rod pivotally connected to said lever intermediate its ends, said cylinder adapted for connection with a fluid pressure source for effecting angular raising and lowering of said boom.

9. The tree trimmer of claim 1, a rotatable drum mounted on said first gear housing, a cable wound around said drum, extending upwardly of said sleeves and over the top of said second gear housing, an arcuate guide tube secured upon said second gear housing through which said cable loosely extends, and a lazy tongs branch clamp secured upon the free end of said cable for securing a tree branch during sawing thereof whereby upon release of said pressure fluid from the interior of said tubes, and upon release of said lazy tongs clamp from the branch, return movement of said cable will bring said clamp into operative engagement with said arcuate guide for mechanically and telescopically collapsing and retracting said guides and tubes.

References Cited in the file of this patent

UNITED STATES PATENTS

| | | |
|---|---|---|
| 1,592,656 | Corona | July 13, 1926 |
| 1,602,357 | Georgelis | Oct. 5, 1926 |
| 2,583,971 | Shuff | Jan. 29, 1952 |
| 2,684,695 | Howell | July 27, 1954 |